US006772434B1

(12) United States Patent
Godwin (10) Patent No.: US 6,772,434 B1
(45) Date of Patent: Aug. 3, 2004

(54) DEVICE AND METHOD FOR THE INTEGRATED PRESENTATION OF A SECONDARY SERVICE AS A PART OF A PRIMARY SERVICE

(75) Inventor: John P. Godwin, Los Angeles, CA (US)

(73) Assignee: The DIRECTV Group, Inc., El Segundo, CA (US)

(*) Notice: Subject to any disclaimer, the term of this patent is extended or adjusted under 35 U.S.C. 154(b) by 0 days.

(21) Appl. No.: 09/577,792

(22) Filed: May 24, 2000

(51) Int. Cl.[7] .................... H04N 7/16; H04N 7/167; H04N 5/445; H04N 7/20; H04N 7/173; G06F 3/00; G06F 13/00; H04K 1/10

(52) U.S. Cl. .................. 725/68; 725/25; 725/27; 725/30; 725/31; 725/48; 725/49; 725/59; 725/38; 725/39; 725/61; 725/64; 725/66; 725/70; 725/71; 725/109; 725/110; 725/131; 725/132; 725/139; 725/140; 725/151; 725/152; 380/33; 380/223; 380/241; 380/242

(58) Field of Search .................. 725/25–31, 38–39, 725/61, 109–110, 63–72, 48–49, 59, 131, 132, 139, 140, 151, 152; 380/241, 33, 223, 242

(56) References Cited

U.S. PATENT DOCUMENTS

| | | | |
|---|---|---|---|
| 4,392,022 A | 7/1983 | Carlson | |
| 4,484,027 A | 11/1984 | Lee et al. | |
| 4,890,322 A | 12/1989 | Russell, Jr. | |
| 4,969,209 A | 11/1990 | Schwob | |
| 5,210,611 A | 5/1993 | Yee et al. | |
| 5,296,931 A | 3/1994 | Na | |
| 5,550,576 A | 8/1996 | Klosterman | |
| 5,673,089 A | 9/1997 | Yuen et al. | |
| 5,828,945 A | 10/1998 | Klosterman | |
| 5,886,746 A | 3/1999 | Yuen et al. | |
| 5,900,867 A | 5/1999 | Schindler et al. | |
| 5,901,366 A | 5/1999 | Nakano et al. | |
| 5,909,183 A | 6/1999 | Borgstahl et al. | |
| 5,963,269 A | 10/1999 | Beery | |
| 5,963,624 A | 10/1999 | Pope | |
| 5,966,187 A | * 10/1999 | Do | ............................. 348/584 |
| 5,978,050 A | 11/1999 | Lee | |
| 5,982,411 A | 11/1999 | Eyer et al. | |
| 6,037,877 A | 3/2000 | Matthews | |
| 6,133,910 A | * 10/2000 | Stinebruner | .................. 725/49 |
| 6,154,206 A | * 11/2000 | Ludtke | ........................ 713/168 |
| 6,262,780 B1 | 7/2001 | Ho et al. | |
| 6,405,372 B1 | * 6/2002 | Kim et al. | ..................... 725/50 |
| 6,522,342 B1 | * 2/2003 | Gagnon et al. | ............. 345/716 |

FOREIGN PATENT DOCUMENTS

| | | |
|---|---|---|
| EP | 0966121 A2 | 12/1999 |
| GB | 2340637 | 2/2000 |

* cited by examiner

*Primary Examiner*—John Miller
*Assistant Examiner*—Michael W. Hoye
(74) *Attorney, Agent, or Firm*—John A. Crook; Georgann S. Grunebach (57) ABSTRACT

A method and apparatus for providing an integrated presentation of existing media program services and secondary media program services is described. The method comprises the steps of receiving and displaying an electronic program guide comprising channels and programs carried by both the primary service and the secondary service, accepting a election of a secondary media program or channel displayed on the electronic program guide but transmitted on a secondary media program channel; accessing a mapping to determine a primary media program channel associated with the selected secondary media program channel; commanding a first tuner module to receive conditional access information associated with the primary media program channel from the primary service provider; evaluating the conditional access information to determine if a second tuner is authorized to receive the secondary media program channel and or evaluating the subscriber access information carried on the electronic program guide; and commanding a second tuner module to receive the secondary media program if the second tuner is authorized to receive the secondary media program channel.

28 Claims, 7 Drawing Sheets

DEVICE AND METHOD FOR THE INTEGRATED PRESENTATION OF A SECONDARY SERVICE AS A PART OF A PRIMARY SERVICE

BACKGROUND OF THE INVENTION

1. Field of the Invention

The present invention relates to systems and methods for providing television, audio, and other media to subscribers, and in particular to a method and system for controlling a receiver configured to receive a media program from a primary media provider to receive a secondary media program from a secondary media provider.

2. Description of the Related Art

Television programs are distributed to viewers by a variety of broadcasting methods. These methods include traditional analog broadcast television (National Television Systems Committee or "NTSC" standard), the digital broadcast television (Advanced Television Systems Committee or "ATSC" standard), cable television (both analog and digital), and satellite broadcasting (both analog and digital). These methods allow channels of television content to be multiplexed and transmitted over a common transmission medium.

Program guides for television programming are known in the art. A common method for obtaining television programming information is by consulting paper television programming guides or schedules. This method of disseminating information, however, has limitations. A paper guide may become obsolete or a schedule may change, rendering the paper copy useless. Additionally, the paper schedule may easily be lost.

Electronic program guides have been used to alleviate some of the limitations of paper. One example is a cable system that provides a continuous feed of guide information to a dedicated television channel. The channel displays continuous program listings. The continuous nature of the link allows the guide to be updated and reflect current scheduling information. An alternate method of providing guide content is to send it, along with program content, through satellite transmissions to receiving stations.

Typically, electronic program guides are based around the use of a scheduling grid. This grid typically involves one axis which corresponds to time and another axis which corresponds to transmission channels. At the intersection of each channel and time slot is a "cell" which typically displays the title of the program that is being shown on that channel at that time.

The number of media programs available to the consumer has been increasing dramatically. Unfortunately, many of these programming alternatives are provided by different program service providers. One such program service provider is DIRECTV, which provides television and audio services to customers via a satellite broadcast. Another such program service provider is the Satellite Digital Audio Radio Service (SDARS) currently under development by XM SATELLITE RADIO. This system proposes to transmit programming, primarily audio, via satellite (and ground transponders where necessary) to mobile and fixed terrestrial receivers. As a consequence, the media programs broadcast by one program service provider cannot be received on the receiving equipment of the other program service provider. Further, conditional access techniques (which prevent unauthorized individuals from obtaining access to the media programs) are typically implemented by both of the service providers, requiring the subscriber to subscribe to separate services and to manage two separate accounts. What is needed is a system for an integrated presentation of the media programs from primary service providers and secondary service providers, and an integrated technique for managing conditional access to the programs provided by different service providers. The present invention satisfies that need.

SUMMARY OF THE INVENTION

In summary, the present invention describes a system and method for providing an integrated presentation of a secondary service as a part of a primary service. One embodiment of the present invention comprises the steps of accepting a selection of a secondary media program transmitted on a secondary media program channel; accessing a mapping to determine a primary media program channel associated with the selected secondary media program channel; commanding a first tuner module to receive conditional access information associated with the primary media program channel from the primary service provider; evaluating the conditional access information to determine if a second tuner is authorized to receive the secondary media program channel; and commanding a second tuner module to receive the secondary media program if the second tuner is authorized to receive the secondary media program channel. Another embodiment of the invention comprises the steps of receiving program guide information from the primary service provider in a first tuner module wherein the program guide information includes a description of each of the primary and secondary media programs and primary program channels associated with each of the primary and secondary media programs; generating an integrated program guide comprising a combination of the primary media programs and the secondary media programs and the primary program channels; and presenting the integrated program guide information.

The apparatus comprises a first tuner module for receiving a primary signal having at least one of a set of primary media programs and conditional access information from a primary service provider, a second tuner module for receiving a secondary signal having at least one of a set of secondary media programs from a secondary service provider, a conditional access module, communicatively coupled to the first tuner for processing the conditional access information provided by the primary service provider to enable a determination of whether a user is entitled to receive at least one of the primary media programs and whether a user is entitled to receive at least one of the secondary media programs, and a controller module, communicatively coupled to the first tuner module, the second tuner module, and the conditional access module, for enabling presentation of the first media programs by the first tuner when the first tuner is entitled to receive the primary media programs and the secondary media programs when the user is entitled to receive secondary media programs.

Given two separate systems for the delivery (and/or retrieval and storage) of media programs and information, the present invention presents the information (television, audio, text, graphics, etc.) in an integrated manner as if it were obtained from the same service provider (e.g. the primary service provider). The present invention uses conditional access techniques, an electronic program guide, and receiver hardware elements of the primary service to control the display of the secondary service's content as provided by receiving elements from a secondary service receiver. Without the present invention, the content of the secondary service would ordinarily be retransmitted over the primary service distribution system, consuming precious bandwidth and transmission capacity. Further, the present invention allows the secondary service provider to utilize the program guide and conditional access capabilities of the primary service provider and to find a broader audience for its programming. Retransmission of the secondary services over the primary system can also unnecessarily complicate the management of content and distribution rights.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which show, by way of illustration, several embodiments of the present invention. It is understood that other embodiments may be utilized and structural changes may be made without departing from the scope of the present invention.

Figure 1:
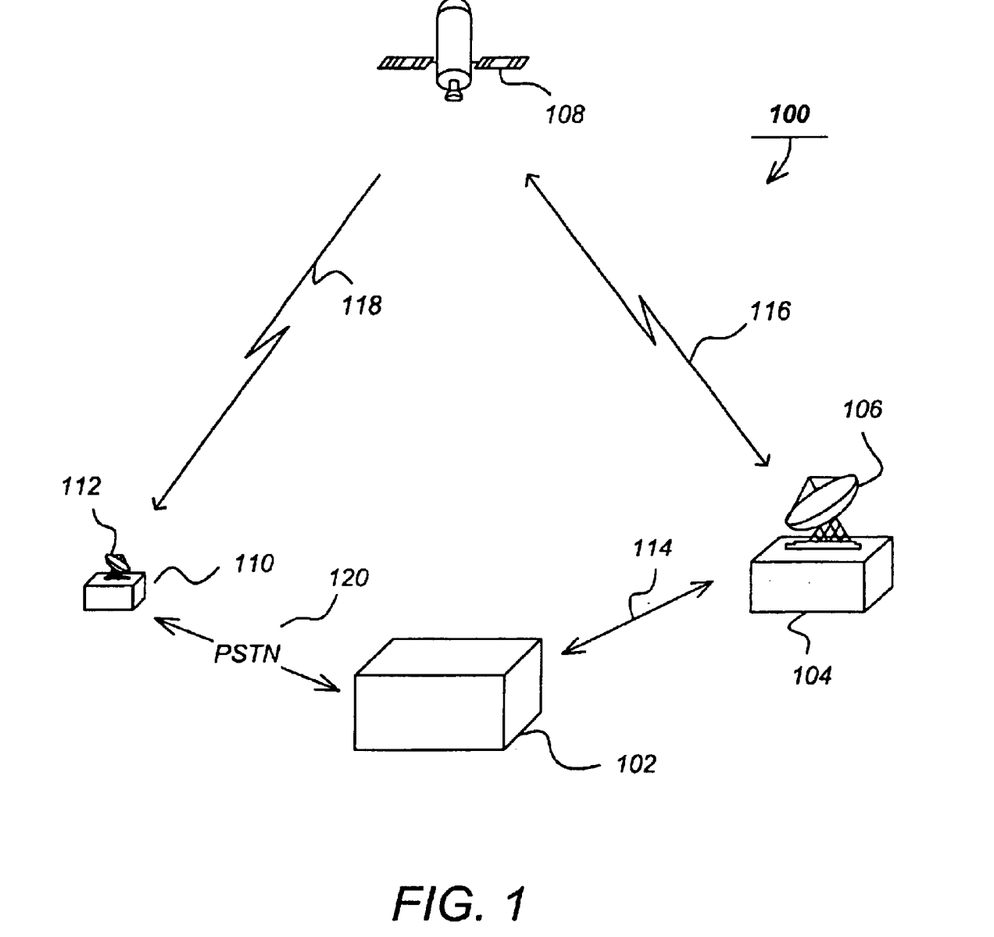
FIG. 1 is a diagram showing an overview of a video distribution system.

FIG. 1 is a diagram illustrating an overview of a video distribution system 100 which represents the "primary" service as described herein. The video distribution system 100 comprises a control center 102 in communication with an uplink center 104 via a ground link 114 and with a subscriber receiver 110 (hereinafter alternatively referred to as an integrated receiver/decoder, or IRD) via a public switched telephone network (PSTN) or other link 120. The control center 102 provides program material to the uplink center 104, communicates with the subscriber receivers 110 indirectly via 112 and directly via other link 120 to offer subscription and pay-per-view (PPV) program services.

The uplink center 104 receives program material and program control information from the control center 102 and other services, and using an uplink antenna 106, transmits the program material and program control information to the satellite 108 via uplink 116. The satellite receives and processes this information, and transmits the video programs and control information to the subscriber via downlink 118. The subscriber receiver 110 receives this information using the subscriber receiver antenna 112. In one embodiment, the subscriber receiver antenna 112 is an offset-fed parabolic dish.

The video distribution system 100 can comprise a plurality of satellites 108 to provide high power levels per transponder to provide wider terrestrial coverage, to provide additional channels, or to provide additional bandwidth per channel. In one embodiment of the invention, each satellite comprises 16 transponders to receive and transmit program material and other control data from the uplink center 104 and provide it to the subscriber receivers 110. However, using data compression and multiplexing techniques the television channel capabilities are far greater than the number of transponders. For example, two-satellites 108 working together can receive and broadcast over 200 standard definition channels via 32 transponders.

While the invention disclosed herein will be described with reference to a satellite based video distribution system 100, the present invention may also be practiced wherein the primary service provider uses a terrestrial-based transmission of program information, whether by broadcasting means, cable, or other means. Further, the different functions collectively allocated among the control center 102 and the uplink center 104 as described above can be reallocated as desired without departing from the intended scope of the present invention.

Although the present invention will be described with respect to an embodiment in which the program material delivered to the subscriber is television material such as the CNN or ESPN channels the methods described herein can be used to deliver program material comprising multimedia content or purely audio information.

Figure 2:
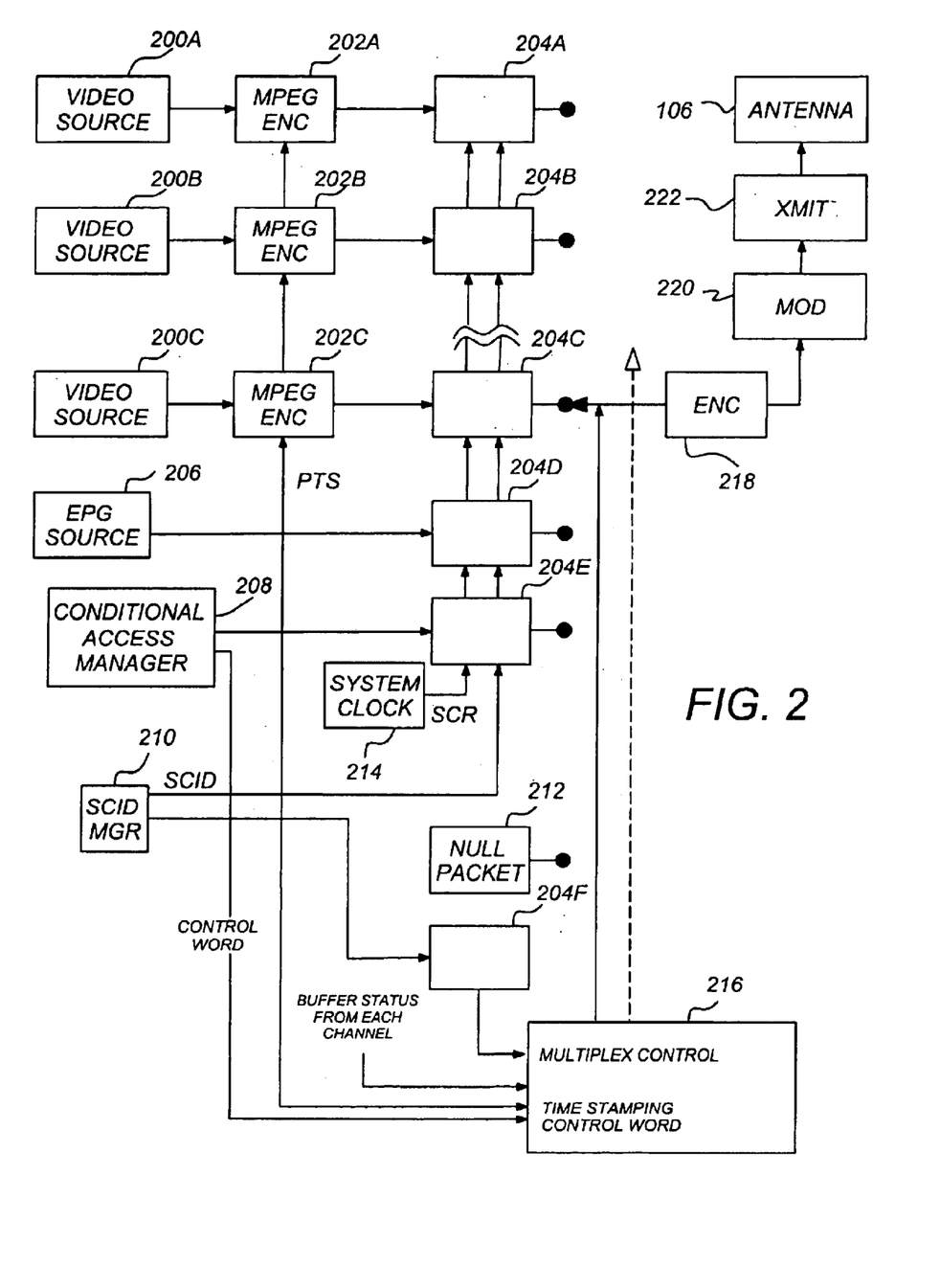
FIG. 2 is a block diagram showing a typical uplink configuration showing how video program material is uplinked to a satellite for transmission to subscribers using a single transponder.

FIG. 2 is a block diagram showing a typical uplink configuration for a single satellite 108 transponder, showing how television video channels are uplinked to the satellite 108 by the control center 102 and the uplink center 104. FIG. 2 shows three video channels (which could be accompanied by one or more audio channels not illustrated), and a data channel for Electronic Program Guide (EPG) information.

The video channels are provided by a program source of video material 200A–200C (collectively referred to hereinafter as video source(s) 200). The data from each video program source 200 is provided to an encoder 202A–202C (collectively referred to hereinafter as encoder(s) 202). Each of the encoders accepts a program time stamp (PTS) from the controller 216. The PTS is a wrap-around binary time stamp that is used to assure that the video information is properly synchronized with the audio information after encoding and decoding. A PTS time stamp is sent with each I-frame of the MPEG encoded data.

In one embodiment of the present invention, each encoder 202 is a second generation Motion Picture Experts Group (MPEG-2) encoder, but other decoders implementing other coding techniques can be used as well. The EPG data channel is fully compressed and formatted before delivery to the uplink station 104. After encoding by the encoders 202, the signals are converted into data packets by a packetizer 204A–204F (collectively referred to hereinafter as packetizer(s) 204) associated with each source 200.

The data packets are assembled using a reference from the system clock 214 (SCR), and from the conditional access manager 208, which provides a control word to the packetizers 204 and to the controller 216. The control word is used to determine which media programs with be presented to the subscriber. Another processor 210 assigns virtual channel numbers or service channel identifiers (SCIDs) to each of the data packets, and provides the SCIDs to the packetizers 204 and to the controller 216. These data packets are then multiplexed into serial data and transmitted, but their headers contain SCIDs which refer back to their source data streams.

FIG. 2 diagrams the encoding and transmission of a single transponder by the primary service provider (PSP), but a similar diagram could apply to the secondary service provider (SSP). In the example used herein, the SSP system is greatly simplified because it provides only audio services and does not require extensive EPG and conditional access of the PSP.

Figure 3A:
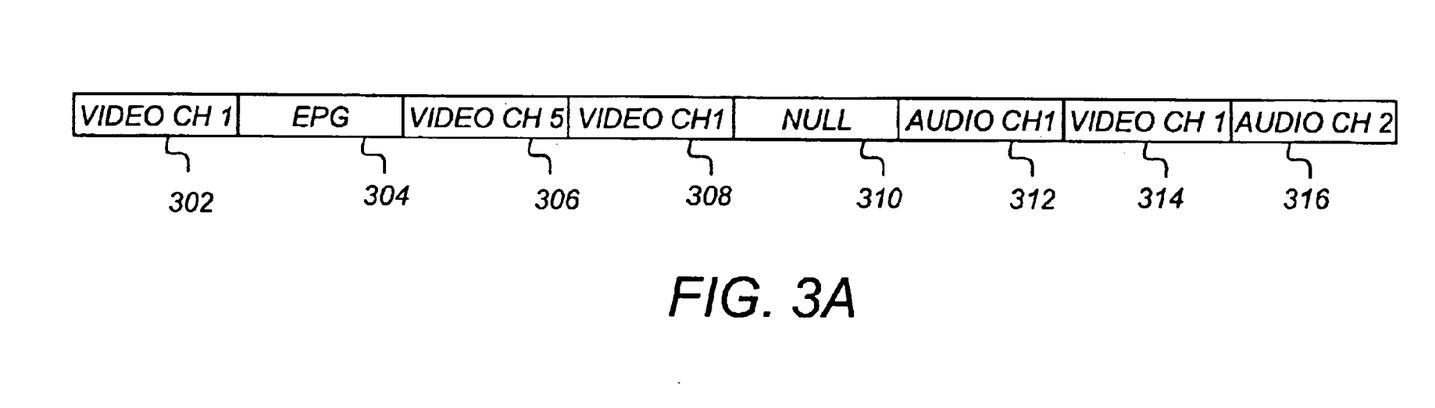
FIG. 3A is a diagram of a representative data stream received from a satellite.

FIG. 3A is a diagram of a representative data stream as broadcast by the PSP using the satellite 108. The first packet segment 302 comprises information from video channel 1 (data coming from, for example, the first video program source 200A). The next packet segment 304 comprises EPG information that was obtained, for example from the EPG data source 206. The next packet segment 306 comprises information from video channel 5 (from one of the video program sources 200), and the next packet segment 308 includes information from video channel 1 (again, coming from the first video program source 200A). The data stream therefore comprises a series of packets 302–316 form any one of the data sources in an order determined by the controller 216. The data stream is encrypted by the encryption module 218, modulated by the modulator 220 (typically using a QPSE modulation scheme), and provided to the transmitter 222, which broadcasts the modulated data stream on a Ku-band carrier to the satellite via the antenna 106. The subscriber receiver 110 receives these signals, and by scanning the SCID numbers in the packet header, reassembles the packets to regenerate the program material for each of the channels. As shown in FIG. 4A, null packets created by the null packet module 212 may be inserted into the data stream as needed to fill the data stream.

Figure 3B:
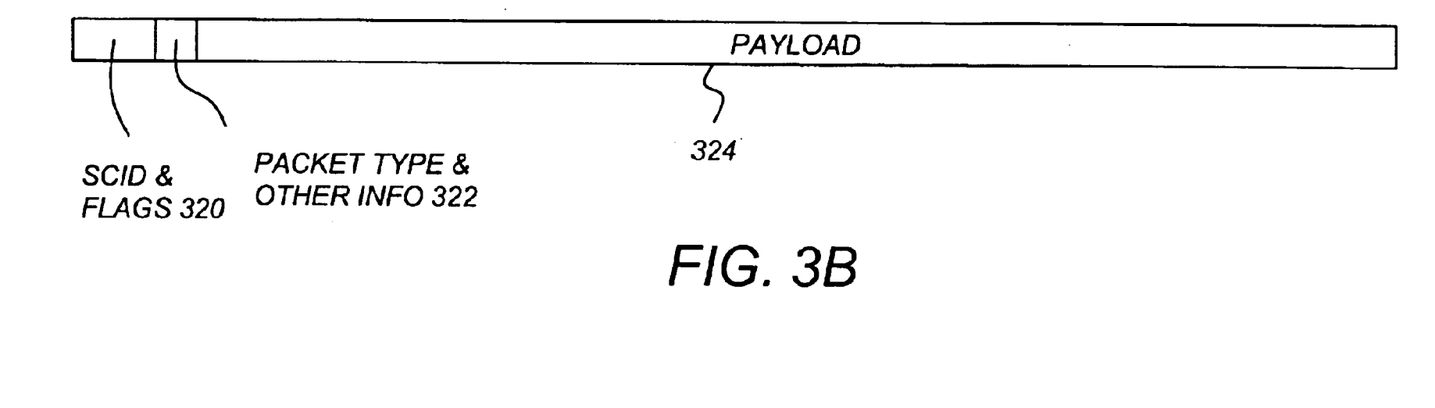
FIG. 3B is a diagram illustrating the structure of a data packet.

FIG. 3B is a diagram of a data packet. Each data packet (e.g. 302–316) is 147 bytes long, and comprises a number of packet segments. The first packet segment 320 comprises two bytes of information containing the SCID and flags. The SCID is a unique 12-bit number that uniquely identifies the packet's virtual channel number. The flags include 4 bits that are used to control whether the packet is encrypted, and what key must be used to decrypt the packet. The second packet segment 322 is made up of a 4-bit packet type indicator and other overhead information. The packet type identifies the packet as one of the four data types (video, audio, data, or null). When combined with the SCID, the packet type determines how the data packet will be used. The next packet segment 324 comprises 127 bytes of payload data, which is a portion of the video program provided by the video program source 200.

Figure 4:
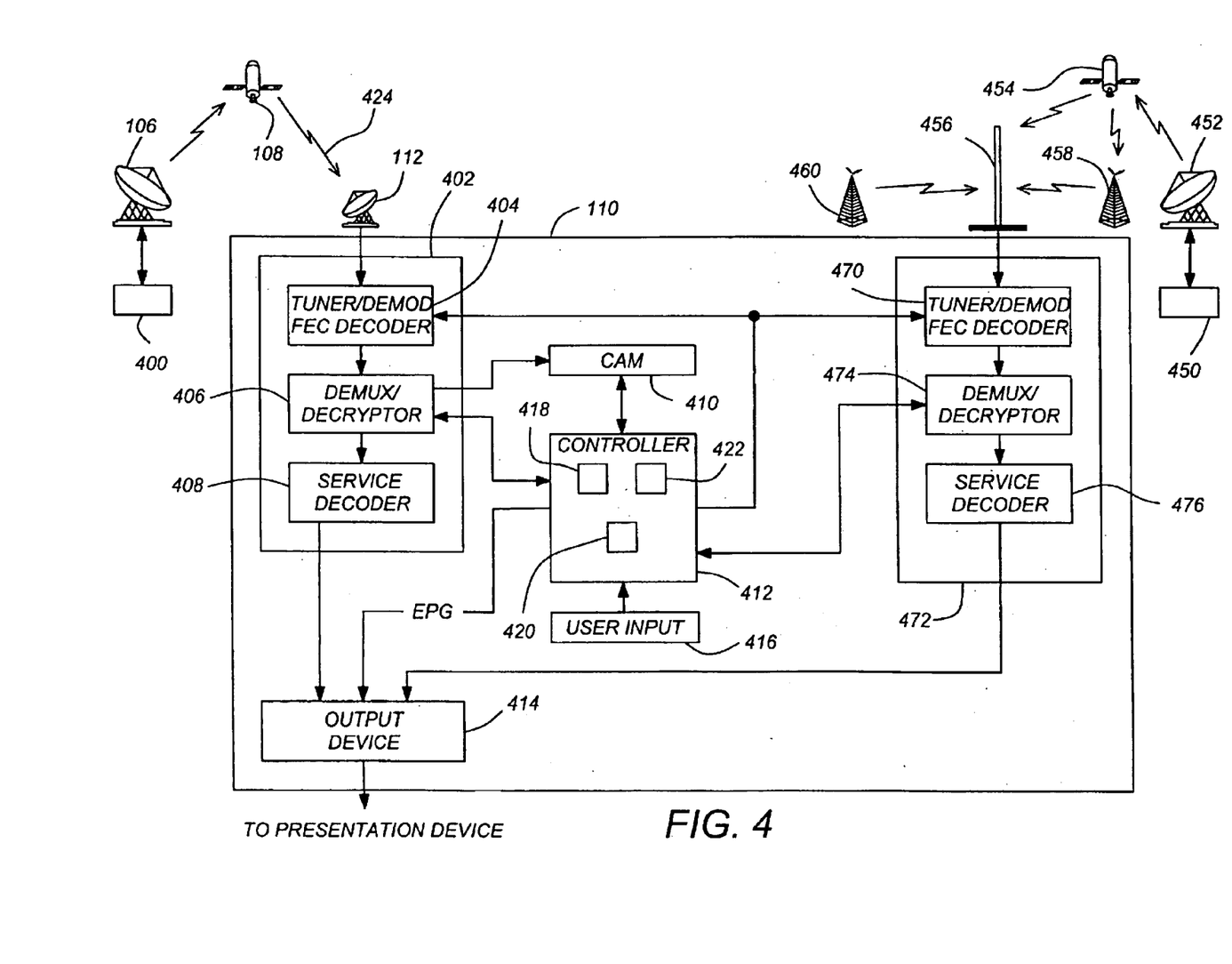
FIG. 4 is a block diagram of an integrated receiver/decoder usable in practicing the present invention.

FIG. 4 is a block diagram of one embodiment of the subscriber receiver or IRD 110 of the present invention. The IRD 110 comprises a first tuner module 402 communicatively coupled to a low noise block converter (LNB) in the subscriber receiver antenna 112. The tuner/demod and EEC decoder 404 of the first tuner module 402 receives the primary signal that is transmitted from a satellite 108, scans the SCID numbers in the packet header, reassembles the packets with associated SCID numbers to regenerate the program material. For example, a particular media program may be a video program having both video and audio content. When the subscriber wants to view this media program, the subscriber selects the primary media (viewer) channel associated with the desired media program into the IRD 110. The IRD accesses a mapping to determine which service channel(s) (SCIDs) provide the video and audio information for the selected media program. The IRD 110 then assembles the data packets having the SCID(s) associated with the media program. The assembled data is then provided to an output device 414, and under the control of a communicatively coupled controller module 412, routes the signal from the output device to a presentation device such as a television, computer, or audio system.

The primary signal 424 includes at least one of a set of primary media programs such as the television programs provided by a primary service provider 400. The primary service provider may include, for example the elements described with respect to FIGS. 1 and 2, including video sources 200. In one embodiment, the primary media programs are provided by a service provider such as DIRECTV using its direct broadcast system The IRD 110 also comprises a second tuner module 472 communicatively coupled to a secondary service receiver antenna 456. The second tuner module 472 comprises a tuner/demodulator FEC decoder 470, a demux/decryptor 474 and a service decoder 476 which provides a functionality similar to the associated components in the first tuner module 402, but applied to signals received from the secondary service provider 450. The second tuner module 472 receives a secondary signal provided by a secondary service provider 450. Under control of the communicatively coupled controller module 412, the second tuner module 472 provides the received secondary signal to the output device 414 for eventual presentation on a communicatively coupled presentation device.

In one embodiment, the secondary signal is uplinked from the secondary service provider 450 to a secondary service satellite 454. A transponder in the secondary service satellite 454 receives and retransmits the secondary signal to the secondary service receiver antenna 456. Additionally, the signal is received and retransmitted by a terrestrial transponder 458 before reception by the secondary service receiver antenna 456. In another embodiment, the secondary signal is provided directly to the secondary service receiver antenna 458 by a terrestrial transmitter 460. In one embodiment the secondary service provider is the space and terrestrial system proposed by XM SATELLITE RADIO, Inc.

The primary signal 424 also includes conditional access information provided by the primary service provider 400. The conditional access information is transmitted in packets identified by the appropriate headers, received by the first tuner module 402 and provided to the conditional access module 410. The conditional access module 410 processes the conditional access information provided by the primary service provider 400 to enable a determination of whether a user or subscriber is entitled to receive any of the channels or media programs provided by the primary service provider 400. The conditional access information provided by the primary service provider may also include conditional access information regarding the media programs provided by a secondary service provider 450. This conditional access information is also provided to the conditional access module 410, where similar processing is performed to determine if the user or subscriber is entitled to receive the media programs provided by the secondary service provider 450.

The primary signal 424 also includes program guide information, which describes the media programs provided by the primary service provider 400 on each of the primary program channels. The program guide information may also provide information describing the media programs provided by the secondary service provider 450, and relate such information to primary media program channels. In this embodiment, program guide information for both the primary media programs and the secondary media programs is transmitted by the primary service provider on a primary service channel identified by one or more designated service channel IDs. The controller 412 operates with the first tuner module 402 to identify and assemble data packets having this designated service ID. Electronic program guide (EPG) information can be thus assembled by the IRD 110 and provided to the output device 414 for the presentation device. This is accomplished by use of a first EPG module 418 which generates an integrated program guide associating primary media programs and secondary media programs to primary program channels, a second EPG module 420, which accesses a mapping between primary program channels and secondary program channels, and module 422 which commands the first tuner module 402 and the second tuner module 472 (as determined by the media program selected by the user) to receive the program.

In one embodiment, the EPG displays the media program and the viewer channel (VC) (analogous to the primary media program channel) associated with that program. The VC is typically a number presented on the program guide identifying the "channel" which is carrying the media program. Using the user input device 416 to provide suitable input to the controller 412, the user can select one of the viewer channels.

Media programs are typically carried by a broadcast operational channel (BOC) having two or more channels corresponding to two or more service channel IDs (SCID), including a video SCID and an audio SCID. More than one audio SCID may be associated with a viewer channel, and many viewer channels can be associated with a single BOC. This allows a media program (such as an advertisement) to appear on multiple viewer channels (and hence, in multiple positions in the program guide).

Using information stored either in the controller 412 or in a memory accessible to the controller 412 relating the viewer channel to the service channel ID(s) identifying the data packets carrying the selected media program, the controller 412 instructs the demux/decryptor 406 to identify and assemble the data packets having the proper service channel ID(s).

If the program material is unencrypted, it may be passed to the service decoder 408 and thence to the output device 414. If the program material is encrypted, conditional access information is provided to the conditional access module 410 which processes the information provided by demux/decryptor 406 to enable a determination as to whether a user is entitled to receive one of the primary media programs or one of the secondary media programs.

Figure 5:
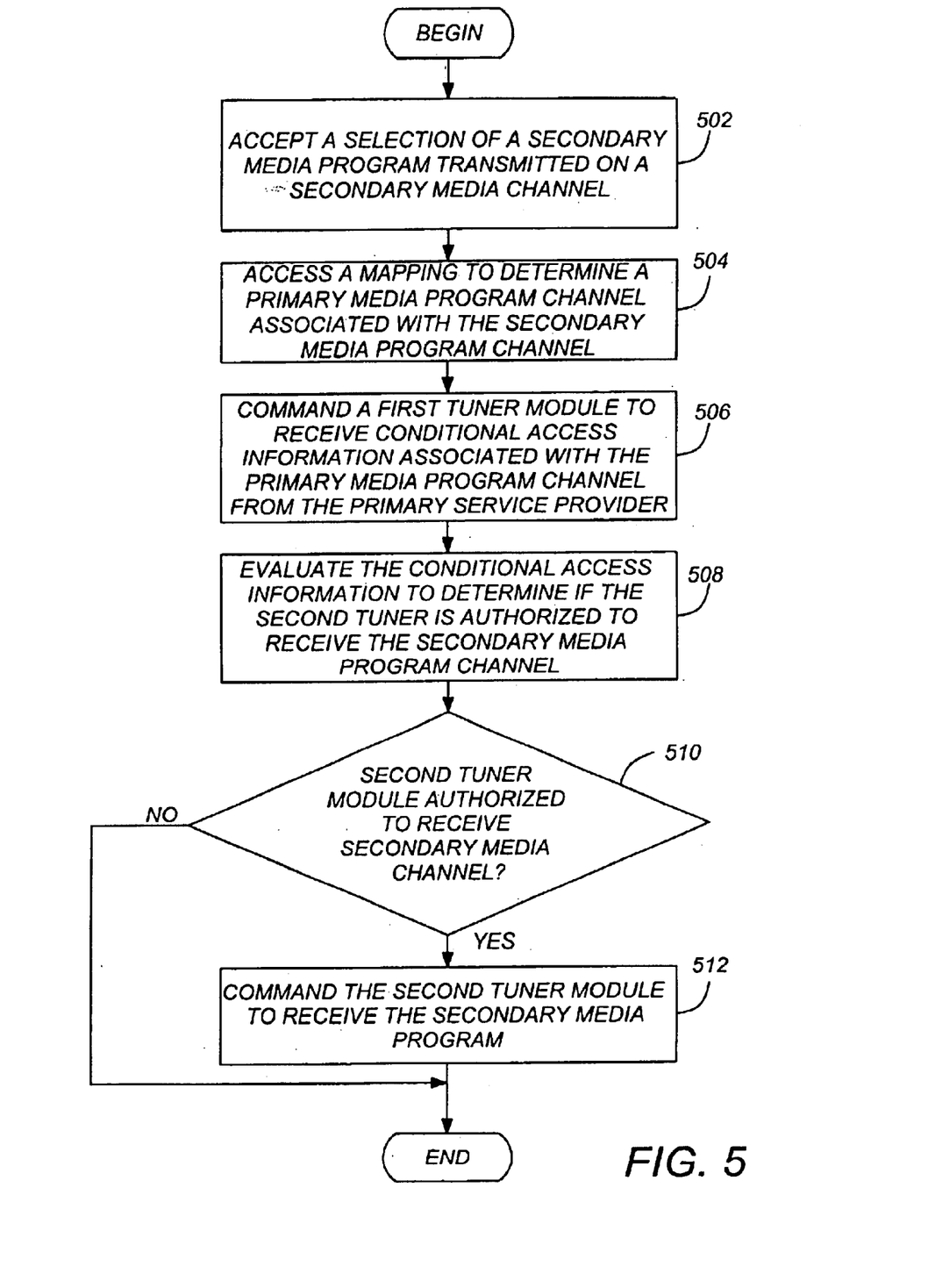
FIG. 5 is a flow chart presenting exemplary method steps used to practice one embodiment of the present invention.

FIG. 5 is a flow chart presenting exemplary method steps used to practice one embodiment of the present invention. A subscriber selection of a secondary media program room the secondary media provider 450 is accepted 502. A mapping is then accessed 504 by the controller 412 or similar device to determine a primary media channel associated with the secondary media channel. A first tuner module 402 is then commanded 506 to receive conditional access information over a utility channel of the primary service provider regarding the secondary media channel. The conditional access information is then evaluated 508 to determine if the second tuner module 476 is authorized to receive the secondary program channel. This decision is represented by block 510. If so, the second tuner module is commanded 512 to receive the secondary media program. In the embodiment illustrated in FIG. 4, the controller 412 provides the necessary command(s) to the second tuner module 472.

Figure 6:
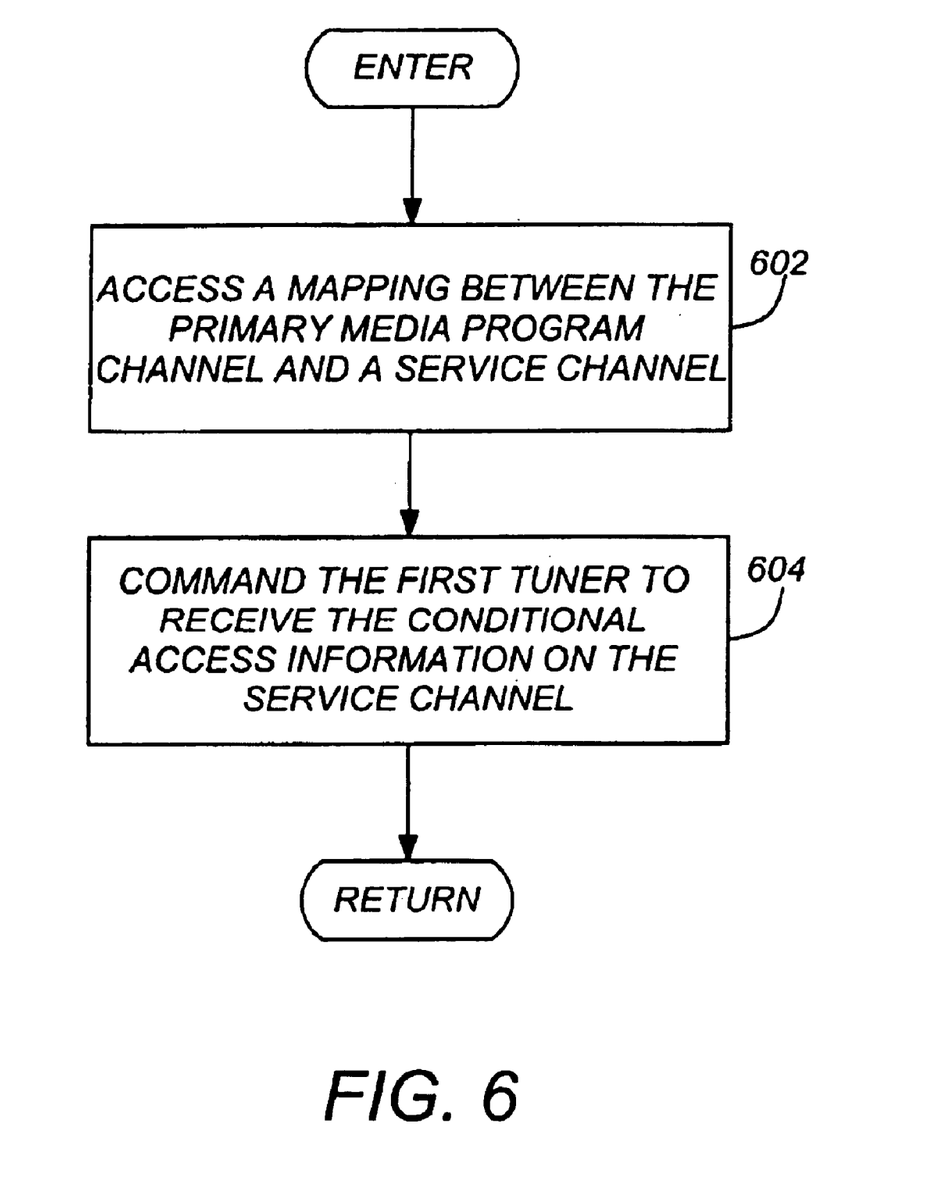
FIG. 6 is a flow chart presenting exemplary method steps useful in evaluating the conditional access information to determine if the second tuner is authorized to receive the secondary media programs.

FIG. 6 is a diagram showing exemplary method steps of evaluating the conditional access information to determine if the second tuner is authorized to receive the secondary media program channel. A mapping between the primary media program channel and a service channel is accessed 602. The information in the service channel identified from the mapping includes conditional access information that is used to determine whether the second tuner module 472 should be granted access to the secondary media program associated with the primary media program.

Table 1 provides an illustrative example of the foregoing processes. The first column of Table 1 provides the primary media channels or viewer channels. These viewer channels are presented to the user, for example, in the electronic program guide (EPG). In case A, a single service channel ID (SCID) has been associated with the viewer channel. Conditional access information (CA) is transmitted on that service channel ID by the PSP, and that conditional access information can be used by the controller 412 to verify that the user is authorized to receive all 5 secondary media program channels from the secondary service provider (SSP) 450. The PSP transmits no program information on SCID 0001. In the illustrated example, the secondary service provider 450 provides audio information on listener channels (LCs) 1, 2, 3, 4, and 5. This content is broadcast over the SSP's system.

TABLE 1

| PSP | | | | SSP |
|---|---|---|---|---|
| Electronic Program Guide | | | | |
| VC No. | SCID (audio) | SCID (data) | CA Service ID | Content LC No. |
| Case A | | | | |
| 1101 | 0001 | | X | 1 |
| 1102 | 0001 | | X | 2 |
| 1103 | 0001 | | X | 3 |
| 1104 | 0001 | | X | 4 |
| 1105 | 0001 | | X | 5 |
| Case B | | | | |
| 1101 | 0001 | | X | 1 |
| 1102 | 0002 | | X | 2 |
| 1103 | 0003 | | X | 3 |
| 1104 | 0004 | | Y | 4 |
| 1105 | 0005 | | Y | 5 |
| Case C | | | | |
| 1101 | 0001 | | X | 1 |
| 1102 | 0002 | | X | 2 |
| 1103 | 0003 | | X | 3 |
| 1104 | 0004 | | Y | 4 |
| 1105 | 0005 | 0006 | Z | 5 |

In case B, a different SCID is associated with each viewer channel, thus allowing different conditional access information to be transmitted for each of the viewer channels. By providing different conditional access information for each of the viewer channels, case B thus allows enforcement of subscriber access to different subsets of the set of secondary media programs. For example, in Table 1, a first subset of channels including viewers channels 1101, 1102, and 1103 (corresponding to listener channels 1, 2, and 3) would be available to IRDs 110 configured to decode conditional access service X, whereas a second subset of channels including viewer channels 1104 and 1105 (corresponding to listener channels 4 and 5) would be available to IRDs 110 authorized to decode the subscription designated by conditional access information Y.

In case C, a different SCID is again associated with each viewer channel, thus allowing different conditional access information to be transmitted for each of the viewer channels. Here, however, unlike case B, three sets of listener channels, each with different conditional access information, are provided. The third set of listener channels (indicated by the conditional access information Z) is also associated with the service SCID 0006, which carries auxiliary program material such as a data service which can include text, graphics or other information. The auxiliary program material can be related to that of the listener channel (channel 5 in the illustrated example). For example, the auxiliary program material can include specialized text and graphics about the audio program on channel 5, using ATVEF or similar technology. ATVEF (Advanced Television Enhancement Forum) defines a multimedia format intended for dual use across both television broadcasting and web casting. This can be used to provide a "music video" effect when integrated with music from the second tuner module 472.

Another example of the invention's use is similar to that which is described in Table 1, but an application in which television (video and audio) is carried by the secondary system. This supplementary audio could include additional languages or "descriptive" audio.

Figure 7:
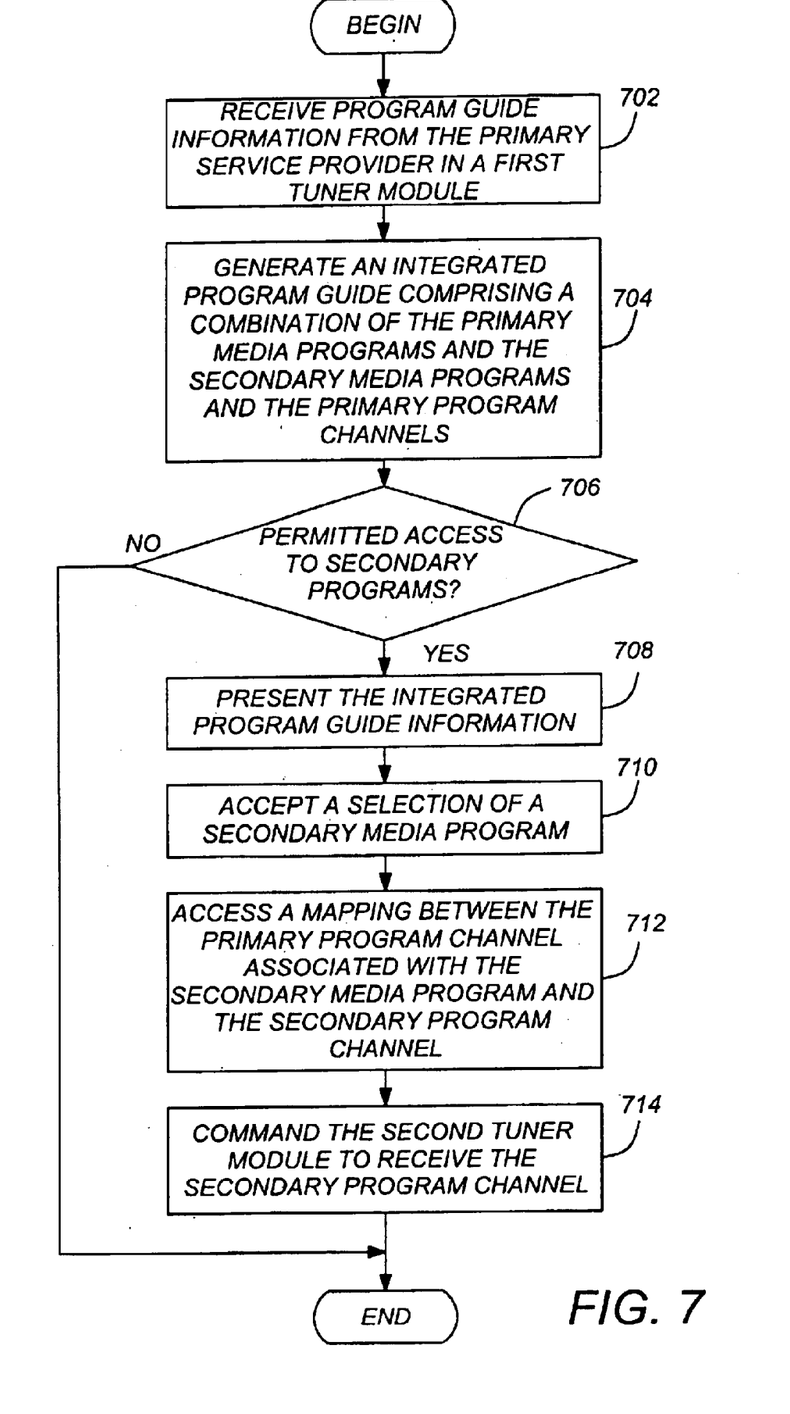
FIG. 7 is a flow chart presenting exemplary method steps used to practice a second embodiment of the present invention.

FIG. 7 is a flow chart presenting exemplary process steps used to practice another aspect of the present invention. Program guide information is received 702 from the primary service provider 400 in a first tuner module 402. The integrated program guide (which is received and stored 704) includes a combination of the primary media programs and the secondary media programs and the primary channels (or viewer channels) associated with each. In one embodiment of the present invention, a program guide including the primary media programs and the secondary media programs is presented to the user as an on-screen EPG.

In another embodiment of the present invention, a determination is made to determine which of the secondary (and primary) media programs the second tuner module 472 (and hence the user) is entitled to receive, and only the secondary media programs that the user is entitled to receive are presented in the integrated program guide. This is depicted in blocks 706 and 708. In yet another embodiment, the user is presented with an EPG having the secondary media programs, but access to the secondary media programs is not provided. Instead, if the user attempts to select these programs, a message is provided indicating that an additional subscription is required. This aspect of the invention can replace or supplement certain portions of the conditional access system.

The user may then select a media program using the EPG. Typically, the media program is selected by selecting the viewing channel associated with the program using the user input device 416 or similar device. The IRD 110 accepts 710 the selection, and accesses 712 a mapping between the primary program channel (such as the viewer channel) and the secondary program channel (such as the listener channel). The second tuner module is then commanded 714 to receive the secondary program channel, using this mapping.

Conclusion

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of controlling a receiver to receive at least one of a set of secondary media programs from a secondary media provider, wherein the receiver is configured to receive at least one of a set of primary media programs from a primary service provider the method comprising the steps of:

accepting a selection of a secondary media program;

accessing a mapping to determine a primary media program channel associated with the selected secondary media program;

receiving conditional access information associated with the primary media program channel in the first tuner module from the primary service provider;

evaluating the conditional access information to determine if a second tuner module is authorized to receive the secondary media program; and commanding the second tuner module to receive the secondary media program if the second tuner module is authorized to receive the secondary media program channel.

2. The method of claim 1, wherein the step of receive receipt conditional access information associated with the primary media program channel in the first tuner module from the primary service provider comprises the steps of:

accessing a mapping between the primary media program channel and a service channel having the conditional access information; and commanding the first tuner module to receive the condition access information on the service channel.

3. The method of claim 2, wherein each of the set of secondary media programs are associated with one service channel.

4. The method of claim 2, wherein each of the secondary media programs in the set of secondary media programs are associated with a different service channel.

5. The method of claim 2, wherein the set of secondary media programs comprises at least one subset of secondary media programs, and each of the subset of secondary media programs is associated with one service channel.

6. The method of claim 2, wherein the service channel further comprises auxiliary program material related to the program material transmitted on the secondary media program channel.

7. The method of claim 1, wherein the conditional access information comprises a control word having a service ID indicating whether the second tuner module is authorized to receive the secondary media program.

8. The method of claim 1, further comprising the step of:
receiving program guide information describing the set of primary media programs and the set of secondary media programs from the primary service provider; and
presenting the program guide information.

9. The method of claim 1, wherein the step of receiving conditional access information associated with the primary media program channel in the first tuner module from the primary service provider comprises the steps of:

receiving a command message over a utility channel of the primary service provider, the command message having conditional access information indicating if access to a subset of the set of secondary media programs is authorized.

10. The method of claim 9, wherein:

the command message is received in a subset of a set of first tuner modules; and the command message further comprises conditional access information indicating which subset of the set of secondary media programs is authorized.

11. A method of controlling a receiver to receive at least one of a set of secondary media programs from a secondary media provider on a plurality of secondary program channels, wherein the receiver is configured to receive at least one of a set of primary media programs from a primary service provider on a plurality of primary program channel, the method comprising the steps of:

receiving program guide information from the primary service provider in a first tuner module, the program guide information including a description of each of the primary and secondary media programs and primary program channels associated with each of the primary and secondary media programs;

generating an integrated program guide comprising a combination of the primary media programs and the secondary media programs and the primary program channels; and presenting the integrated program guide information.

12. The method of claim 11, further comprising the steps of:

accepting a selection of a secondary media program;

accessing a mapping between the primary program channel associated with the secondary media program and the secondary program channel; and commanding a second tuner module to receive the secondary program channel.

13. The method of claim 11, further comprising the steps of:

determining if access to the set of secondary media programs is authorized, and generating and presenting an integrated program guide only if access to the set of secondary media programs is authorized.

14. The method of claim 13, wherein the step of determining if access to the set of secondary media programs is authorized comprises the steps of:

receiving a command message over a utility channel of the primary service provider, the command message having conditional access information indicating if access to a subset of the set of secondary media programs is authorized.

15. The method of claim 13, wherein:

the command message is received in a subset of a set of first tuner modules; and the command message further comprises conditional access information indicating which subset of the set of secondary media programs is authorized.

16. The method of claim 11, further comprising the steps of:

determining if access to a subset of the set of secondary media programs is authorized, and generating and presenting a subset of the integrated program guide only if access to the subset of the second set of secondary media programs is authorized.

17. An integrated receiver, comprising:

a first tuner module for receiving a primary signal having at least one of a set of primary media programs and conditional access information from a primary service provider;

a second tuner module for receiving a secondary signal having at least one of a set of secondary media programs from a secondary service provider;

a conditional access module, communicatively coupled to the first tuner module, for processing the conditional access in information provided by the primary service provider to enable a determination of whether the first tuner module is entitled to receive at least one of the set of primary media programs and whether the second tuner module is entitled to receive at least one of the secondary media programs; and a controller module, communicatively coupled to the first tuner module, the second tuner module and the conditional access module, the controller module for enabling presentation of the first media programs by the first tuner module when the first tuner module is entitled to receive primary media programs and the secondary media programs by the second tuner module when the second tuner module is entitled to receive secondary media programs.

18. The device of claim 17, wherein the conditional access information received from the primary service provider enables a determination of whether the user is entitled to receive all of the secondary media programs.

19. The integrated receiver of claim 17, wherein:

the primary signal includes a plurality of service channels, each associated with a service channel ID, wherein one of the service channels comprises the conditional access information; and the controller module comprises a first module for reading the conditional access information from the service channel and a second module for evaluating the conditional access information to determine if the second tuner module is authorized to receive all of the second media programs.

20. The device of claim 17, wherein the conditional access information received from the primary service provider enables a determination of whether the user is entitled to receive a subset of the set of secondary media programs.

21. The integrated receiver of claim 17, wherein:

the conditional access information includes conditional access data for each of the secondary media programs; and the primary signal includes a plurality of service channels, each associated with a service channel ID, wherein conditional access for each secondary media program is indicated by a separate service channel.

22. An integrated receiver, comprising:

a first tuner module, for receiving at least one set of primary media programs, program guide information describing the set of primary media programs, and a set of secondary media programs from a primary service provider, each of the primary media programs associated with a primary program channel;

a second tuner module, for receiving at least one of the set of secondary media programs from a secondary service provider, each of the secondary media programs associated with a secondary program channel; and a controller, communicatively coupled to the second tuner module and the first tuner module, for selectably providing the received primary media program and the received secondary media program for presentation according to a mapping between secondary media channels and primary media channels stored in a memory accessible to the controller.

23. The device of claim 22, further comprising a user input device for accepting a selection of a primary program channel, and wherein the controller comprises:

a first a module for accessing a mapping between the selected primary program channel and a secondary program channel; and a second module for commanding the second tuner module to receive the secondary program channel.

24. The device of claim 22, wherein the controller further comprises:

a third module for generating an integrated program guide associating at least one of the set of primary media programs and at least one of the set of secondary media programs to a primary program channel.

25. The device of claim 22, wherein the controller further comprises:

a third module for generating an integrated program guide associating all of the secondary media programs in the set of secondary media programs with a primary program channel when access to all of the secondary media programs is authorized.

26. The device of claim 22, wherein the controller further comprises:

a third module for generating an integrated program guide associating a subset of the set of secondary media programs with a primary program channel when access to the subset of the set of secondary media programs is authorized.

27. The device of claim 22, wherein the first tuner module receives a command message over a utility channel of the primary service provider, the command message having conditional access information indicating if access to a subset of the set of secondary media programs is authorized.

28. The device of claim 25, wherein the command message further comprises conditional access information indicating which subset of the set of secondary media programs is authorized.

* * * * *